United States Patent [19]

Tsuboyama

[11] Patent Number: 4,744,639
[45] Date of Patent: May 17, 1988

[54] FERROELECTRIC LIQUID CRYSTAL DEVICE HAVING A FLATTENING LAYER

[75] Inventor: Akira Tsuboyama, Tokyo, Japan

[73] Assignee: Canon Kabushiki Kaisha, Tokyo, Japan

[21] Appl. No.: 809,722

[22] Filed: Dec. 17, 1985

[30] Foreign Application Priority Data

Dec. 20, 1984 [JP] Japan .................... 59-269886

[51] Int. Cl.⁴ ............................... G02F 1/13
[52] U.S. Cl. .................... 350/350 S; 350/339 R; 350/341; 350/344
[58] Field of Search ............. 350/333, 339 R, 341, 350/350 S, 344

[56] References Cited

U.S. PATENT DOCUMENTS

| 3,966,305 | 6/1976 | Young | 350/341 |
| 4,341,445 | 7/1982 | Matsuyama et al. | 350/344 |
| 4,561,726 | 12/1985 | Goodby | 350/341 |
| 4,586,791 | 5/1986 | Isogai | 350/341 |
| 4,596,667 | 6/1986 | Inukai et al. | 350/350 S X |
| 4,634,228 | 1/1987 | Iwasaki et al. | 350/350 S X |

Primary Examiner—Stanley D. Miller
Assistant Examiner—Richard F. Gallivan
Attorney, Agent, or Firm—Fitzpatrick, Cella, Harper & Scinto

[57] ABSTRACT

A liquid crystal device, comprising a pair of parallel base plates and a ferroelectric liquid crystal disposed therebetween. At least one of the pair of parallel base plates has thereon an electrode, and a flattening layer coating the base plate and the electrode. The ferroelectric liquid crystal is disposed in contact with the flattening layer.

37 Claims, 6 Drawing Sheets

FERROELECTRIC LIQUID CRYSTAL DEVICE HAVING A FLATTENING LAYER

FIELD OF THE INVENTION AND RELATED ART

The present invention relates to a liquid crystal device such as a liquid crystal display and a liquid crystal optical shutter array, and more particularly, to a liquid crystal device having improved display and driving characteristics through improved initial orientation of liquid crystal molecules.

As a conventional liquid crystal device, there has been known, for example, one using TN (twisted nematic) type liquid crystals, as shown in "Voltage-Dependent Optical Activity of a Twisted Nematic Liquid Crystal" by M. Schadt and W. Helfrich "Applied Physics Letters" vol. 18, No. 4 (Feb. 15, 1971) pp. 127-128. This TN-type liquid crystal device involves a problem in that a crosstalk phenomenon occurs when a device having a matrix electrode structure arranged to provide a high picture element density is driven in a time division manner, so that the number of picture elements is restricted.

Further, there is known a type of display device, wherein each picture element is provided with a switching element comprising a thin film transistor connected thereto so that the picture elements are switched respectively. This type of device, however, requires an extremely complicated step for forming thin film transistors on a base plate and moreover involves a problem that it is difficult to produce a large screen display device.

In order to dissolve these problems, there has been made public a ferroelectric liquid crystal device utilizing a ferroelectric liquid crystal placed under a bistability condition as disclosed by Clark et al. in, e.g., U.S. Pat. No. 4,367,924. However, in order for this ferroelectric liquid crystal device to realize desired driving characteristics, it is required that a ferroelectric liquid crystal disposed between a pair of parallel base plates has a molecule arrangement such that molecules thereof can effectively be switched between the two stable states independent of the application of an electric field. For instance, with respect to a ferroelectric liquid crystal having a chiral smectic phase, it is required that there is formed a region (monodomain) where liquid crystal layers having a chiral smectic phase are vertical to the surface of base plates, i.e., the axes of the liquid crystal molecules are aligned substantially in parallel therewith. However, in the ferroelectric liquid crystal device proposed heretofore, the orientation or alignment state of the liquid crystal has not satisfactorily been formed, so that desirable performances have not been accomplished.

Especially, in the case where matrix electrodes are arranged at a high density on a base plate as described hereinafter, as each electrode line is formed in a relatively large thickness (e.g., 1000 to 3000 Å) in order to provide a low resistivity of the electrode line, resulting in a step as large as 1000 Å or more between the surface of the base plate per se and the electrode surface, providing a cause by which an orientation defect of a ferroelectric liquid crystal is generated.

SUMMARY OF THE INVENTION

An object of the present invention is to provide a ferroelectric liquid crystal device which prevents the occurrence of orientation defects.

Another object of the present invention is to provide a ferroelectric liquid crystal device which has picture elements arranged at a high density.

A still further object of the present invention is to provide a ferroelectric liquid crystal device which can exhibit a high response speed characteristic and a memory characteristic which a ferroelectric liquid crystal device inherently possesses, by improving the monodomain formability and the initial orientation characteristic which have been problems involved in the conventional ferroelectric liquid crystal devices.

As a result of my further study with the above objects in view and with particular attention to the initial orientation or alignment of a liquid crystal in a temperature decreasing stage wherein the liquid crystal is transformed from an isotropic phase (higher temperature-phase) to a liquid crystal phase, it has become possible to provide a liquid crystal device having such a structure as to accomplish the operation characteristic based on the bistability of the liquid crystal and the monodomain characteristic of the liquid crystal layer. Thus, the liquid crystal device of the present invention is based on such knowledge and is characterized in that it has no step or sharp difference in height on a base plate face contacting a liquid crystal layer, that is to say, no abrupt change in thickness of the liquid crystal layer is caused, whereby the initial alignment characteristic during the temperature decreasing stage has been improved and a monodomain free of alignment defects has been formed.

Thus, the liquid crystal device according to the invention comprises: a pair of parallel base plates and a ferroelectric liquid crystal disposed therebetween, at least one of the pair of parallel base plates having thereon an electrode, and a flattening layer coating the base plate and the electrode, the ferroelectric liquid crystal being disposed in contact with the flattening layer. In a liquid crystal layer sandwiched between such base plates with good planarity, a liquid crystal region gradually spreads during a temperature decreasing stage for causing transformation from the isotropic phase to the liquid crystal phase, thereby to result in a monodomain of the liquid crystal phase.

These and other objects, features and advantages of the present invention will become more apparent upon a consideration of the following description of the preferred embodiments of the present invention taken in conjunction with the accompanying drawings.

DETAILED DESCRIPTION OF PREFERRED EMBODIMENTS

Formation of a chiral smectic phase and a bistability condition will now be explained with reference to DOBAMBC described hereinafter as an example of ferroelectric liquid crystal. When the DOBAMBC placed in an isotropic phase is gradually cooled, it is transformed at about 115° C. into a smectic A phase (SmA phase). At this time, if an orientation treatment such as rubbing or oblique vapor deposition of $SiO_2$ has been applied to the base plate, a monodomain is formed wherein the molecular axes of the liquid crystal molecules are aligned in parallel with the base plate and oriented in one direction. On further cooling, the liquid crystal is transformed into a chiral smectic C phase (SmC* phase) at a specific temperature falling within the range of from about 90° to 75° C. and depending on the thickness of the liquid crystal layer. In this instance, when the liquid crystal layer thickness is about 2 μ or smaller, the spiral of the SmC* phase is loosened or unwound to establish a bistability condition.

Liquid crystals which can be suitably used in the present invention are those liquid crystals showing bistability and having ferroelectricity. More specifically, liquid crystals having chiral smectic H-(SmH*), I-(SmI*), J-(SmJ*), K-(SmK*), G-(SmG*) or F-(SmF*) phase may be used in addition to those showing the abovementioned chiral smectic C-(SmC*) phase.

Ferroelectric liquid crystals are described in detail in, e.g., "LE JOURNAL DE PHYSIQUE LETTERS" 36 (L-69) 1975, "Ferroelectric Liquid Crystals"; "Applied Physics Letters" 36 (11) 1980 "Submicro Second Bistable Electrooptic Switching in Liquid Crystals"; "Kotai Butsuri (Solid State Physics)" 16 (141) 1981 "Liquid Crystals", etc. In the present invention, ferroelectric liquid crystals disclosed in these publication may be used.

Specific examples of ferroelectric liquid crystal compounds include decyloxybenzylidene-p'-amino-2 -methylbutyl cinnamate (DOBAMBC), hexyloxybenzylidene-p'-amino-2-chloropropyl cinnamate (HOBACPC), 4-o-(2-methyl)-butyl-resorcylidene-4'-octylaniline (MBRA 8), etc.

When a liquid crystal device is constituted by using these materials, for the purpose of maintaining a temperature so that the liquid crystal compound assumes a chiral smectic phase, the device may be supported, if necessary, by a block of copper in which a heater is embedded, or a suitable supporting member.

Hereinbelow, the present invention will be explained with reference to drawings.

Figures 1, 2:
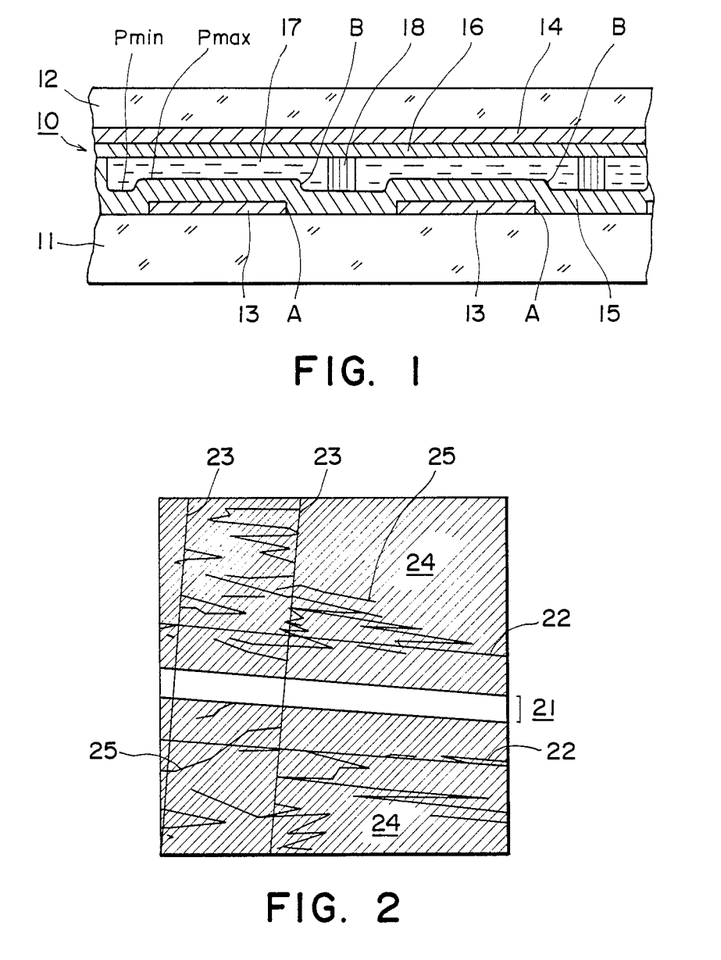
FIG. 1 is a sectional view of a conventional ferroelectric liquid crystal device.
FIG. 2 shows a sketch of a conventional ferroelectric liquid crystal device when observed through a polarizing microscope arranged in cross nicols.

FIG. 1 shows a sectional view of a conventional ferroelectric liquid crystal device and FIG. 2 illustrates orientation defects having appeared in the conventional ferroelectric liquid crystal device.

More specifically, the conventional ferroelectric liquid crystal device 10 shown in FIG. 1 comprises a pair of parallel base plates 11 and 12 provided with stripe-form electrode lines 13 and 14, respectively, which in combination forms a matrix electrode structure. The stripe-form electrode lines 13 and 14 are generally formed of transparent conductor films such as those of ITO (Indium Tin Oxide). When these electrode lines are arranged at a high density, e.g., 16 lines/mm without increasing a film thickness, the resistivity of the electrode line becomes high as the line width becomes extremely small. Accordingly, the electrode line is required to be formed in a thickness which is larger than that of a segment electrode used in ordinary desk-top calculators or watches, more specifically in a thickness of the order of 1000 to 3000 Å, so as to provide a lower resistivity.

As a result, in a liquid crystal device having picture elements arranged at a high density, there is formed a step A corresponding to the electrode thickness (1000 to 3000 Å) between the faces of the electrode 13 and the base plate 11, so that there result in orientation or alignment defects in the ferroelectric liquid crystal 17 with the step A as the source of the defects. This also holds true with a case where orientation controlling films 15 and 16 are formed on the base plates 11 and 12, respectively. Thus, in the case, there is formed a step B on the orientation controlling film 15 corresponding to the step A in a height almost the same as the electrode thickness, whereby similar orientation defects are caused in the same manner as described above.

FIG. 2 shows a sketch of a conventional ferroelectric liquid crystal device as shown in a Comparative Example described hereinafter when observed through a polarizing microscope. In the figure, a white line 21 corresponds to a spacer (denoted by 18 in FIG. 1) used in the liquid crystal device, a line 22 corresponds to a step B on the base plate 11 in FIG. 1 and a line 23 corresponds to a step B (not shown in FIG. 1) on the base plate 12 in FIG. 1. Further, the portion 24 in FIG. 2 shows the ferroelectric liquid crystal sandwiched between the opposite electrodes. Edge-like lines 25 having appeared numerously in a field of vision through the polarizing microscope represent orientation defects in the ferroelectric liquid crystal.

In this manner, if there is present a step (difference between the maximum height face Pmax and the minimum height face Pmin) of 1000 Å or larger on a face contacting a ferroelectric liquid crystal, orientation defects develop and propagate to obstruct the formation of a monodomain of the ferroelectric liquid crystal.

Figure 3A:
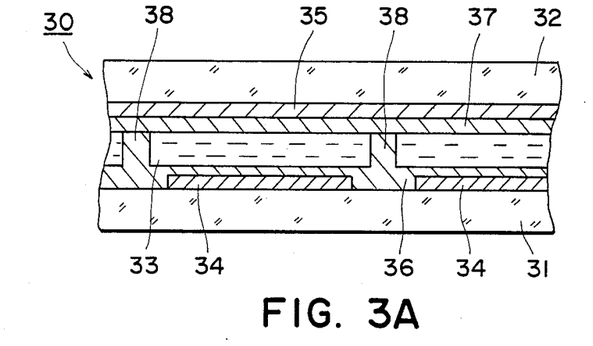
FIG. 3A is a partial sectional view of a ferroelectric liquid crystal device according to the present invention.
Figure 3B:
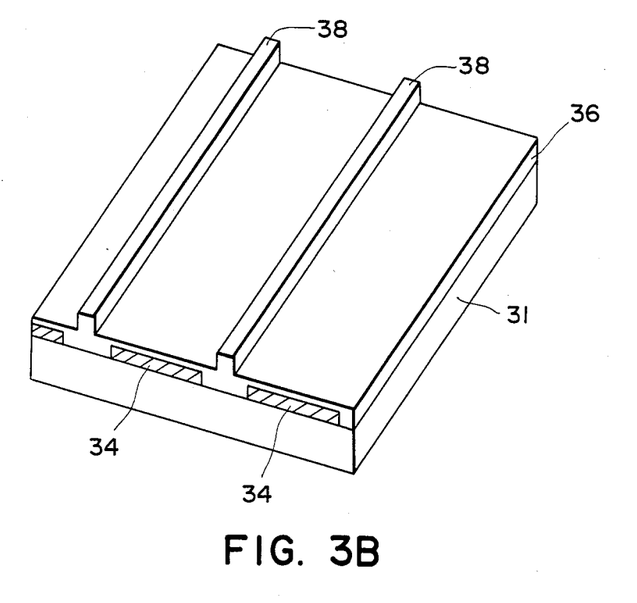
FIG. 3B is a perspective view of one base plate of the device.

FIG. 3A is a sectional view of a preferred ferroelectric liquid crystal device according to the present invention, and FIG. 3B is a perspective view illustrating one base plate used in the device.

A device 30 shown in FIG. 3A comprises a pair of base plates 31 and 32 each composed of a transparent plate such as a glass plate or plastic plate, and a ferroelectric liquid crystal 33 disposed between the base plates. The base plates 31 and 32 are provided with stripe-form electrode lines 34 and 35, respectively, which are arranged to form a matrix electrode structure in combination.

The base plate 31 has a structure as shown in FIG. 3B. Thus, the base plate 31 has electrode lines 34 necessary for constituting a matrix electrode structure and arranged thereon in the form of stripes, and an orientation controlling film 36 coating the base plate 31 per se and the electrode lines 34 is formed integrally with spacer members 38. Such a base plate structure may be formed by uniformly coating a base plate 31 on which electrode lines 34 have already been formed with a thick layer of an insulating material, e.g., by a spinner coating method, and then half-etching the insulating film except for spacer members 38 by a photolithographic technique. As a result, an orientation controlling film 36 with a smooth surface is formed integrally with spacer members 38, and because of the smooth surface of the orientation controlling film 36, the above mentioned problems resulting from steps can be obviated. The thickness of the orientation controlling film 36 may be set to a range of generally 10 Å to 1 $\mu$, preferably 100 Å to 3000 Å, while it depends on the thickness of the ferroelectric liquid crystal layer. The thickness or height of the spacer members 38 determines the thickness of the ferroelectric liquid crystal layer 33 and may be set to a range of generally 0.2 to 20$\mu$, preferably 0.5 to 10$\mu$, while it can change depending on such factors as the kinds of the liquid crystal material and required response speeds.

It is preferred to form an orientation controlling film 37 also on the other base plate 32 for coating the base plate 32 itself and the electrode lines 35. The orientation controlling film 37 may also be formed by forming a relatively thick film of an insulating material, e.g., by a spinner coating method and subjecting the insulating film to a uniform whole-face etching to leave a flat layer. Further, spacer members may also be formed on the base plate 32 in the same manner as in the production of the spacer members on the base plate 31.

More specifically, the flat or flattening layer for coating a base plate used in the invention may be obtained by first forming a relatively thick layer of an insulating material, especially a resin capable of forming spacer members or orientation controlling films as will be described hereinafter, having a thickness sufficient to cover the steps between the base plate face and electrode faces, e.g., by a spinner coating method, and then subjecting the insulating film to a uniform dry etching method, e.g., by plasma etching to reduce the film to a prescribed thickness. For example, when the above mentioned step formed in a thickness or height of 1000Å is covered with an insulating material in a thickness of 1$\mu$ or larger, preferably 2$\mu$ or larger, by the spinner coating method, the step is reduced to 500Å or below on the surface of the coating film, which is further flattened to an order of 300 Å to 500 Å when the coating film is subjected to the dry etching. Thus, the step having appeared between the base plate face and the electrode face can be concealed or minimized to a sufficient level.

In the present invention, the step remaining on the flattening layer between a part above the base plate itself and a part above the electrode can be made less than 1000 Å and can suitably be reduced to 500 Å or less. In contrast thereto, if a base plate with a non-flattened surface having a step of 1000 Å or above, particularly 1200 Å or above, is used to form a liquid crystal device, orientation defects in the form of edge-like lines as shown in FIG. 2 or explained with reference to the Comparative Example described later will appear in the liquid crystal device.

The etching gas to be used in the plasma etching process for producing the flat layer in the present invention, may suitably be an ashing gas such as $O_2$, $CO_2$, $H_2$ or $N_2$, or a rare gas such as He, Ar or Xe, which can be used to etch an organic material even alone; or a mixture of such a gas and a type of gas which can show a desirable characteristic when added to the above mentioned gas, including a fluorocarbon such as $CF_4$, $C_2F_6$, $C_3F_8$ or $CHF_3$, another fluorine-containing gas such as $SiF_4$, $XeF_2$ or $NF_3$, or a chlorine-containing gas such as $Cl_2$, $CCl_4$ or $BCl_3$.

Specific examples of the etching gas include a mixture gas of $O_2$ and $CF_4$, a mixture gas of $CO_2$ and $CF_4$, a mixture gas of $O_2$ and $CCl_4$, and a mixture gas of $N_2$ and $CF_4$.

The content of the fluorine containing gas or chlorine containing gas may suitably be 0.1 to 45%, preferably 20 to 30% with respect to the total volume. If the content is below 0.1%, the effect of addition is insufficient, and above 45%, the function of the ashing gas or rare gas cannot be sufficiently exhibited.

The orientation controlling films 36 and 37 may preferably be formed of a material selected from resins such as polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulosic resin, melamine resin, urea resin and acrylic resin; photosensitive polyimide, photosensitive polyamide, cyclic rubber-type photoresist, phenol novolak-type photoresist, and electron beam-resist such as polymethylmethacrylate and epoxidized-1,4-polybutadiene.

Further, the liquid crystal device according to the present invention may be formed as a type of device wherein respective picture elements are switched by thin film transistors. This type of device comprises a base plate on which picture element electrodes and thin film transistors are arranged in the form of a matrix array. Thus, a flattened layer may be formed on this base plate in the same manner as described above and the flattened layer may also be used as an orientation controlling film, whereby a monodomain of a ferroelectric liquid crystal layer free of orientation defects can be formed.

The above mentioned type of device using thin film transistors for switching picture elements of a ferroelectric liquid crystal is suitable for effecting a highly fine display with less number of lead or signal lines.

Figure 4A:
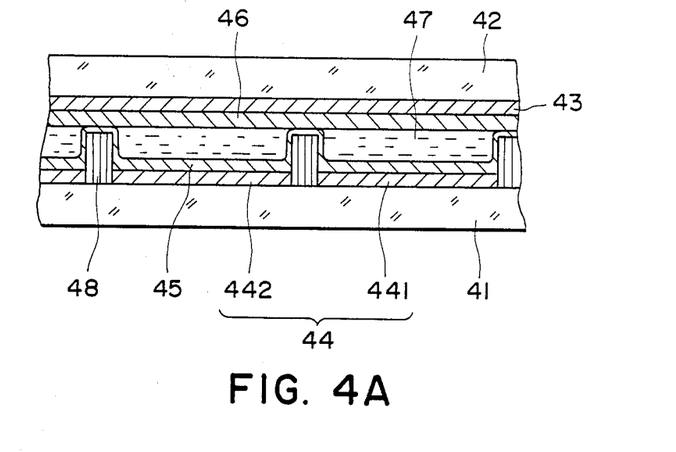
FIG. 4A is a partial sectional view of another ferroelectric liquid crystal device according to the present invention.
Figure 4B:
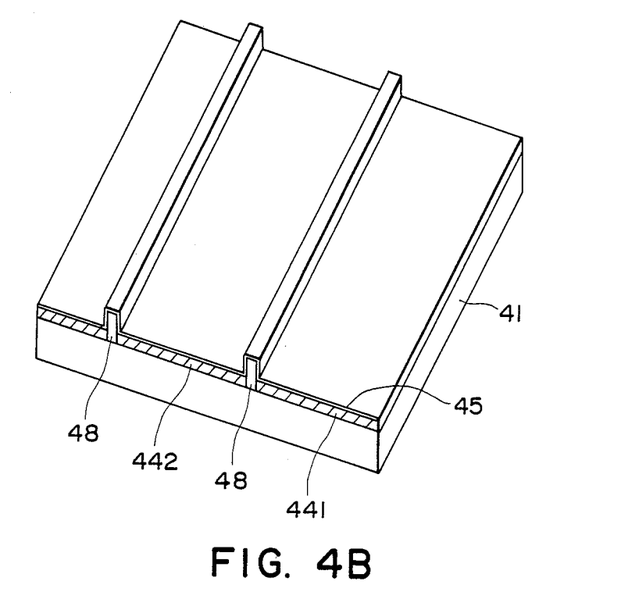
FIG. 4B is a perspective view of one base plate of the device.
Figure 5:
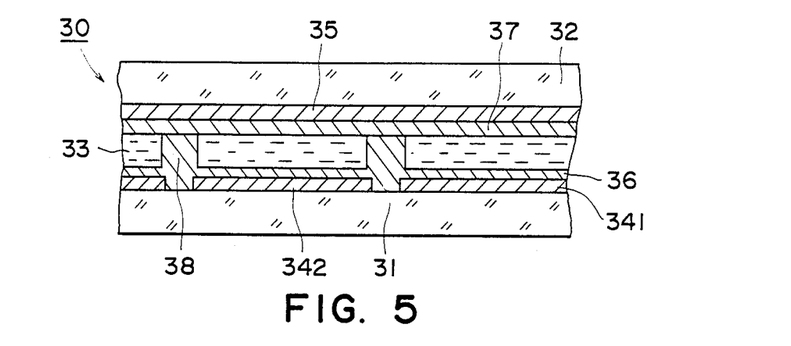
FIG. 5 is a perspective view of another ferroelectric liquid crystal device according to the invention.

In another preferred embodiment of the present invention, an improvement in preventing the occurrence of orientation defects can be accomplished by a liquid crystal device having a flattened layer as shown in FIGS. 4 and 5.

FIG. 4A shows a section of another liquid crystal device according to the present invention, and FIG. 4B is a partial perspective view of one base plate used in the device. The liquid crystal device shown in FIG. 4 comprises a pair of base plates 41 and 42 composed of, e.g., a glass or plastic plate and having thereon electrodes 43 and 44, respectively, formed in a prescribed pattern (stripes in this embodiment); e.g., by etching to provide a matrix electrode structure. The electrodes 43 and 44 (including 441, 442, . . .) are coated with orientation controlling films, and stripe-form spacer members 48 are formed to fill the whole gaps between adjacent pairs of the electrodes 44, e.g. between electrodes 441 and 442. The spacer members 48 determine the thickness of the liquid crystal layer 47. The spacer members 48 may be formed by first forming a layer of an insulating material in a thickness required for a liquid crystal layer thickness, e.g., by spinner coating and then removing the excessive portions by photoetching to leave the stripe-form spacer members 48 along the gaps between the electrodes. Thereafter, the orientation controlling films may be formed as a thin film on the electrodes 44 and 43, respectively, by spinner coating.

The thickness of the orientation controlling films 45 and 46 on the transparent electrodes is set to a range of ordinarily 10 Å to 1μ and preferably 100 Å to 3000 Å.

The material of these orientation controlling films may be selected from the materials as described above for forming the orientation controlling films 36 and 37 in the embodiment of FIG. 3.

The thickness of the liquid crystal layer 47 depends on the readiness of orientation peculiar to the liquid crystal material and a response speed required for the device, but may be set within a range of generally 0.2 to 200μ, preferably 0.5 to 10μ.

FIG. 5 shows a modification of the embodiment shown in FIG. 3, wherein the spacer members extends up to inside the electrodes 341 and 342. The members denoted by the same reference numerals are similar members as those shown in FIG. 3.

Figure 6:
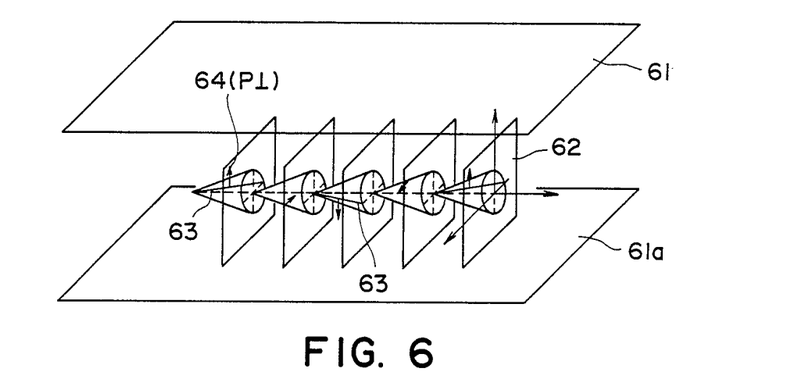
FIGS. 6 and 7 are schematic perspective views for explaining operation principles of a ferroelectric liquid crystal to be used in the invention.
Figure 7:
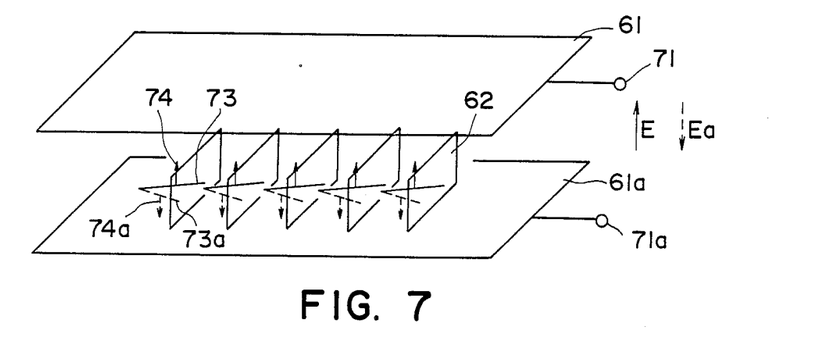

FIG. 6 is a view schematically illustrating an example of a liquid crystal cell for the purpose of explaining the operation of a ferroelectric liquid crystal. Reference numerals 61 and 61a denote base plates (glass plates) coated with transparent electrodes comprising thin films of $In_2O_3$, $SnO_2$, ITO (Indium-Tin Oxide), etc. A liquid crystal having SmC*- or SmH*-phase in which liquid crystal layers 62 are oriented vertically to the surfaces of base plates is hermetically disposed between the base plates 61 and 61a. Full lines 63 denote liquid crystal molecules, respectively. These liquid crystal molecules 63 have dipole moments ($P_\perp$) 64 perpendicular to molecules. When a voltage higher than a certain threshold is applied between electrodes on the base plates 61 and 61a, helical structures of liquid crystal molecules 63 are loosened. Thus, the orientation directions of liquid crystal molecules 63 can be changed so that dipole moments ($P_\perp$) 64 are all directed to the applied electric field. Liquid crystal molecules 63 have elongated shapes, and show refractive index anisotropy between the long and short axes. Accordingly, it is easily understood that, for instance, when polarizers having a cross nicol relationship to each other, (i.e., their polarizing axes are crossing or perpendicular to each other) are arranged on the upper and lower sides of glass surfaces, an liquid crystal optical modulation device of which optical characteristics change depending upon the polarity of an applied voltage can be realized. The thickness of the liquid crystal layer preferably used in the optical modulation device according to the present invention can be made sufficiently thin (e.g., less than 10μ). According as the thickness of the liquid crystal layer becomes thin, the helical structures of liquid crystal molecules are loosened even in the absence of an electric field as shown in FIG. 7. Dipole moments P and Pa can change in either direction, i.e., in upper (74) and lower (74a) directions, respectively. When electric fields E and Ea having polarities different from each other and higher than a certain threshold level are applied to the cell thus formed with voltage applying means 71 and 71a, the dipole moments change in the upper (74) or lower (74a) direction, depending upon the electric field vector of the electric field E or Ea, respectively. In accordance with the changes, the liquid crystal molecules are oriented to either of first stable state 73 and the second stable state 73a.

As previously mentioned, the application of such ferroelectric liquid crystal to an optical modulation devices can provide two major advantages. First is that the response speed is quite fast. Second is that liquid crystal molecules show bistability in regard to their orientation. The second advantage will be further explained, e.g., with reference to FIG. 7. When the electric field E is applied, the liquid crystal molecules are oriented to the first stable state 73. This state is stably maintained even if the applied electric field is removed. On the other hand, when the opposite electric field Ea is applied, they are oriented to the second stable state 73a to change their directions. Likewise, the latter state is stably maintained even if the applied electric field is removed. Further, as long as the given electric field E or Ea is not above a certain threshold level, they are maintained at respective oriented states. For effectively realizing such high response speed and bistability, it is preferable that the thickness of the cell is as thin as possible.

Figure 8:
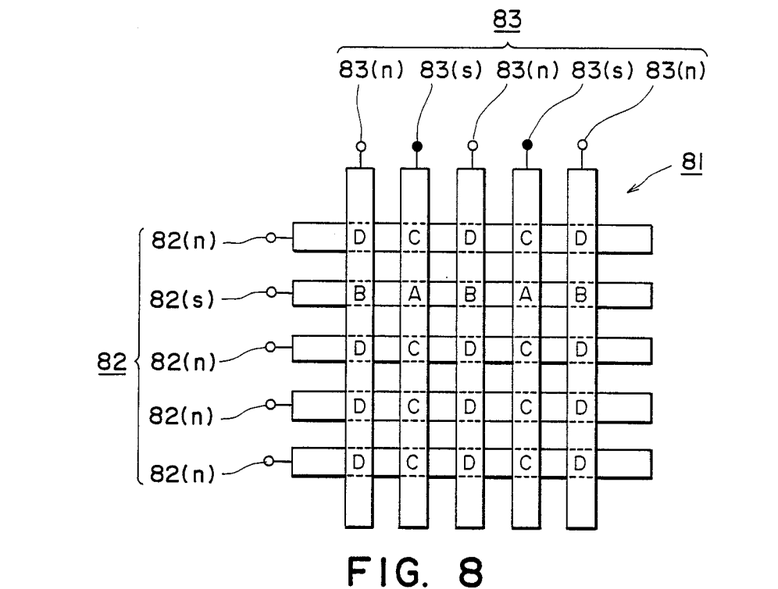
FIG. 8 is a plan view schematically illustrating a matrix electrode arrangement used in the present invention.

FIGS. 8 to 10 show an example of a driving method for the optical modulation device according to the present invention.

Figure 9A:
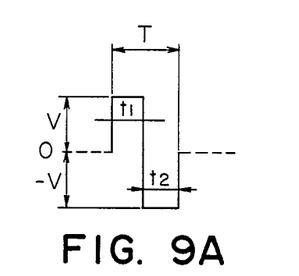
FIGS. 9A to 9D respectively show waveforms for illustrating signals for driving a liquid crystal device according to the present invention.
Figure 9B:
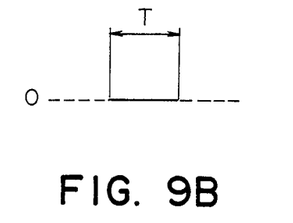
Figure 9C:
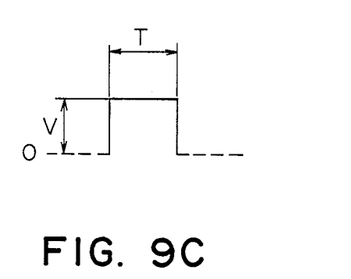
Figure 9D:
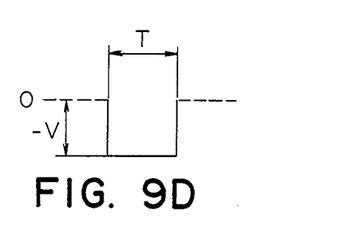
Figure 10A:
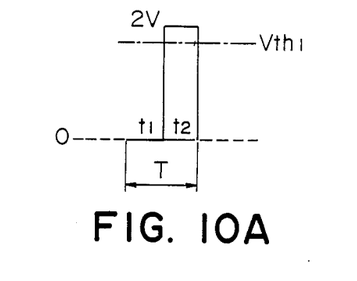
FIGS. 10A to 10D respectively show waveforms showing voltages applied to picture elements.
Figure 10B:
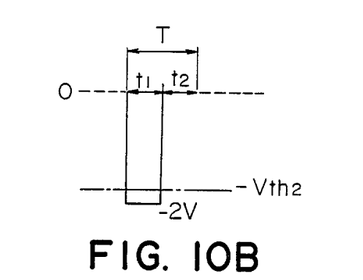
Figure 10C:
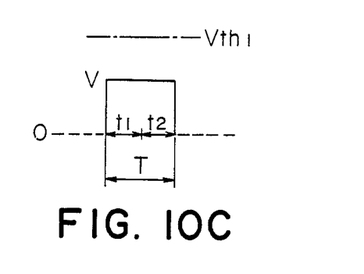
Figure 10D:
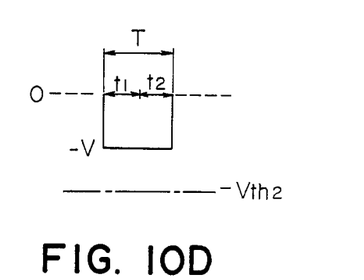

FIG. 8 is a view schematically showing a cell 81 having matrix electrode arrangement between which a ferroelectric liquid crystal compound is interposed. Reference numerals 82 and 83 denote a group of scanning electrodes and a group of signal electrodes, respectively. FIGS. 9A and 9B show electric signals applied to a selected scanning electrode 82(s) and other scanning electrodes (non-selected scanning electrodes) 82(n), respectively. FIGS. 9C and 9D show electric signals applied to selected signal electrodes 83(s) and nonselected signal electrodes 83(n), respectively. In FIGS. 9A to 9D, the abscissa and the ordinate represent a time and a voltage, respectively. For instance, when a motion picture is displayed, a scanning electrode is sequentially and periodically selected from the group of scanning electrodes 82. Here, threshold voltage for a first stable state of a liquid crystal having bistability is represented by $V_{th1}$, and a threshold voltage for a second stable state thereof by $-V_{th2}$. The electric signal applied to the selected scanning electrode 82(s) is an alternating voltage of V and −V at phases (times) of $t_1$ and $t_2$, respectively, as shown in FIG. 9A. The other scanning electrodes 82(n) are earthed, thus resulting in zero volt of the electric signal. On the other hand, electric signals applied to the selected signal electrodes 83(s) have voltages of V as shown in FIG. 9C, while those applied to the non-selected signal electrodes have voltages of −V, as shown in FIG. 9D. The voltages of V and −V are set to desired values satisfying the following relationships, $$V < V_{th1} < 2V, \text{ and}$$

$$-V > V_{th2} > -2V.$$

Voltage waveforms applied to respective picture elements when such electric signals are given are shown in FIG. 10. Voltage waveforms shown in FIGS. 10A to 10D correspond to those applied to picture elements A, B, C and D shown in FIG. 8, respectively. Thus, as seen from FIG. 10, a voltage of 2 V above the threshold voltage $V_{th1}$ is applied to the picture elements A on the selected scanning line at a phase of $t_2$. In contrast, a voltage of $-2$ V below the threshold voltage $-V_{th2}$ is applied to the picture elements B at a phase of $t_1$. Accordingly, the orientation of liquid crystal molecules is determined depending upon whether a signal electrode is selected on the selected scanning electrode line, or not. Namely, when a signal electrode is selected, the liquid crystal molecules are oriented to the first stable state. To the contrary, when not selected, they are oriented to the second stable state. In either case, the orientation is not related to the previous state of each picture element. On the other hand, voltages applied to all picture elements C and D on the nonselected scanning lines are V and $-V$, respectively, either of which is not above the threshold voltage in terms of the absolute value. Accordingly, the liquid crystal molecules corresponding to picture elements C and D maintain the orientation corresponding to the signal state when last scanned without changing the oriented state. Namely, when a certain scanning electrode is selected, signals assigned to the one line of the selected scanning line are written. The written signal states in the line of picture elements are maintained even after the scanning of one frame is completed and until a time at which the line is subsequently selected. Accordingly, even if the number of scanning electrodes increases, the duty ratio does not substantially change, resulting in no possibility of lowering of contrast nor occurrence of crosstalk, etc. In this instance, the value of the voltage V and time width of the phase of $(t_1+t_2)=T$ are usually set to ranges of 3 volts to 70 volts and of 0.1 $\mu$sec. to 2 msec., respectively, although they depend upon the thickness of a liquid crystal material or a cell used. Accordingly, in this case, electric signals applied to a selected scanning electrode cause the transition from the first stable state (referring to "bright" state when they are converted into optical signals) to the second stable state (referring to "dark" state when converted into optical signals), or vice versa.

Figure 11:
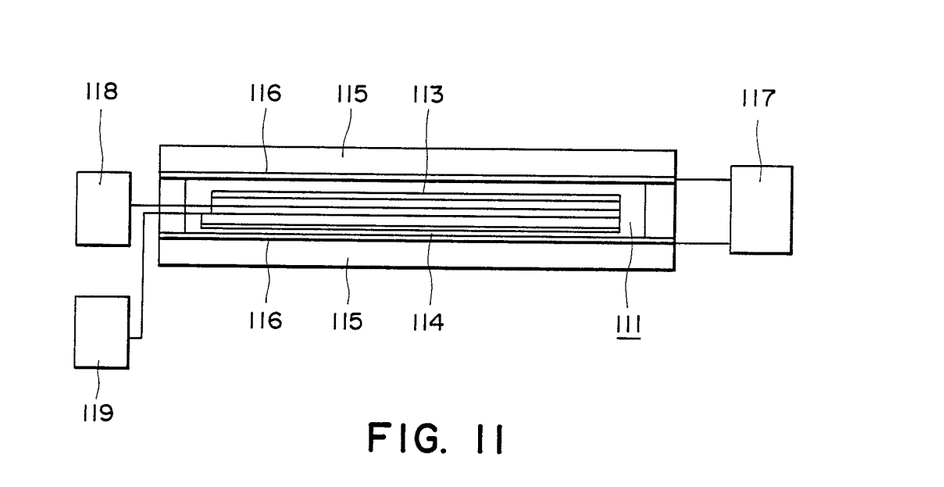
FIG. 11 is a cross sectional view illustrating an embodiment of the liquid crystal device according to the present invention.

FIG. 11 shows another preferable embodiment of the liquid crystal device according to the present invention. A liquid crystal cell 111 similar to those shown in FIGS. 3 to 5 is arranged in a liquid crystal display device for displaying a motion picture shown in FIG. 11. On the both sides of the liquid crystal cell 111, linear polarizers 113 and 114 are arranged in a cross nicol relationship. Behind the linear polarizer 114, a reflective member (preferably, aluminum vacuum deposition film or matted aluminum vacuum deposition film forming an irregular reflective member) may be arranged.

The liquid crystal cell thus constructed is sandwiched between a pair of glass plates 115 provided with NESA films 116. By flowing electric currents through the NESA films 116 with a heating power supply 117, it is possible to effect a temperature control of the liquid crystal cell 111. In this instance, the liquid crystal cell 111 can be satisfactorily operated by electric signals applied to a scanning signal source 118 and an information signal source 119. In the figure, reference numeral 112 denote a spacer member.

Examples of actual production of a liquid crystal device according to the invention will be explained.

EXAMPLE 1

A glass plate on which stripe-shaped electrodes of ITO having a thickness of 1200 Å and a width of 80$\mu$ with a spacing of 20$\mu$ so as to provide a density of 10 pels/mm has been formed, was coated with a polyimide forming solution ("PIO" (polyimide isoindolequinazolinedione) manufactured by Hitachi Kasei Kogyo K.K., nonvolatile matter content of 14.5 wt. %) in 30 min. with a spinner coater rotating at 3000 r.p.m. and thereafter heated at a temperature of 120° C. for 30 min. to form a coating having a thickness of 2$\mu$.

Then, a positive-type resist solution ("AZ1350" manufactured by Shipley Company, Ltd.) was spinner-coated onto the resultant coating and prebaked. The resist layer was exposed to light through a stripeshaped mask having a masking width of 8 $\mu$ and a pitch of 100$\mu$ so that the masking portions of the mask were aligned nearly mid lines between neighboring stripe electrodes on the glass plate. Then, by developing the resist with a developer "MF 132" containing tetramethyl ammonium hydroxide, the resist film of the exposed portion was removed by etching. Then, the non-masked portion of the polyimide was selectively ashed and removed through plasma etching by introducing an etching gas mixture of $O_2$ and $CF_4$ at a flow rate ratio of 3:1 until the film thickness reached 1000 Å to form a flattening layer integral with spacer members. After the resist film was removed, the polymide film was fully cured by heating at 200° C. for 60 min. and at 350° C. for 30 min. and subjected to rubbing in a direction parallel with the spacer members, thereby to prepare an electrode plate A.

Then, in a manner similar to the above except that the photolithography step was omitted, a polyimide flattening layer of 1000 Å in thickness was formed on a glass plate on which stripe-shaped electrodes of ITO having a thickness of 1200 Å and a width of 80$\mu$ with a spacing of 20$\mu$ had been formed, thereby to prepare an electrode plate B.

The surface states of the thus prepared electrode plates was checked with a universal surface shape tester ("SE-3C", mfd. by Kosaka Kenkyusho K.K.), whereby the steps remaining on the polymide films of both electrode plates corresponding to the differences of the electrode portions and the non-electrode portions were only approximately 400 to 500 Å.

The electrode plates A and B thus prepared were arranged so that their stripe pattern electrodes overlapped perpendicularly to each other and their rubbing directions were in parallel with each other to form a cell structure, and DOBAMBC was heated to form an isotropic phase and hermetically inserted into the cell. Then, the cell thus formed was gradually cooled to produce a monodomain liquid crystal device.

The thus prepared liquid crystal device was observed through a polarizing microscope arranged in cross nicols, whereby it was confirmed that the liquid crystal layer was free of edge-like orientation defects which were observed in the comparative example described hereinbelow.

COMPARATIVE EXAMPLE 1

In the same manner as in Example 1, a 2$\mu$-thick polyimide film was formed on an electrode plate provided with 1200 Å-thick ITO stripe electrodes identical to the one used in Example 1. Then, a positive-type resist solution ("AZ 1350", mfd. by Shipley Co., Ltd.) as used in Example 1 was spinner-coated onto the polyimide film and prebaked. The resist layer was exposed to light through a stripe-shaped mask having a masking width of 8μ and a pitch of 100μ. Then, by developing the resist with a developer "MF 132" as used in Example 1, the resist film of the exposed portion and the full thickness of the polyimide film thereunder were removed by etching, followed by washing, drying and removal of the resist mask film. Then, the remaining portions of the polyimide film were cured by heating at 200° C. for 60 min. and 350° C. for 30 min. to prepare spacer members.

Thereafter, a polyimide solution ("PIQ") as used in the above was coated to form a polyimide film of 1000Å in thickness, the surface of which was then rubbed in a direction parallel to the spacer members, thereby to prepare an electrode plate A'.

Then, an electrode plate B' was prepared in the same manner as the electrode plate A' except that the steps for forming the spacer members were omitted.

The surface states of the thus prepared electrode plates A' and B' were checked in the same manner as in Example 1, whereby there were observed steps of the order of 1200 Å.

Then, a liquid crystal device was prepared by using the thus prepared electrode plates A' and B' and observed through a polarizing microscope in the same manner as in Example 1, whereby a large number of orientation defects in the form of edge-like lines as shown in FIG. 2 were observed.

EXAMPLE 2

A glass plate on which stripe-form ITO electrodes having a thickness of 1500 Å and a width of 50μ with a spacing of 12.5μ corresponding to a density of 16 pels/mm, was coated with a 2μ-thick polyimide film by using "PIQ" as in Example 1.

Then, a resist layer was formed on the polyimide film as in Example 1 and exposed to light through a stripe-shaped mask having a masking width of 12.5μ and a spacing of 50μ in alignment with the electrode pattern. Then, by effecting development with a developer "MF 312" containing tetramethylammonium hydroxide to remove the exposed portions of the resist film and the polyimide film thereunder, followed by removal of the resist mask. Then the remaining polyimide portions were heat-cured under the curing conditions to form spacer members filling up the gaps between the ITO electrode lines.

Then, the base plate on which the spacer members were formed was coated with a 1000 Å-thick polyimide flattening layer by applying and curing the "PIQ" as described above under the prescribed conditions. The surface of the polyimide film was rubbed in a direction parallel with the stripe spacer members to obtain an electrode plate C.

On the other hand, a glass plate on which stripe-form ITO electrodes having a thickness of 1500 Å and a width of 50μ with a spacing of 12.5μ was coated with a 10μ-thick polyimide film by using the "PIQ", and the polyimide film was subjected to ashing and removal by plasma etching using the etching gas as used in Example 1 until the film thickness was reduced to 1000 Å. Then, the surface was rubbed to provide an electrode plate D.

The surface states of the polyimide films on these electrode plates C and D were checked in the same manner as in Example 1, whereby substantially no step was observed with respect to the electrode plate C, and steps of only about 300 to 600 Å were observed between the parts of the polyimide film above the electrode portions and non-electrode portions with respect to the electrode plate D.

The electrode plates C and D thus prepared were fixed to each other so that their stripe pattern electrodes overlapped perpendicularly to each other and their rubbing directions were in parallel with each other to form a cell structure, and DOBAMBC was heated to form an isotropic phase and sealed up in the cell. Then, the cell thus formed was gradually cooled to produce a monodomain liquid crystal device.

The thus prepared liquid crystal device was observed through a polarizing microscope, whereby orientation defects as observed in the above Comparative Example were not observed.

What is claimed is:

1. A liquid crystal device, comprising: a pair of parallel base plates and a ferroelectric liquid crystal disposed therebetween; at least one of said pair of parallel base plates having thereon an electrode, and a flattening layer coating the base plate and the electrode, said ferroelectric liquid crystal being disposed in contact with the flattening layer and said electrode comprising a transparent conductor film having a thickness of from 1000 Å to 3000 Å.

2. The liquid crystal device according to claim 1, wherein said flattening layer comprises a film having such a planarity that a difference in height between its portion coating the base plate per se and its portion coating the electrode is less than 1000 Å.

3. The liquid crystal device according to claim 1, wherein said flattening layer comprises a film having such a planarity that a difference in height between its portion coating the base plate per se and its portion coating the electrode is 500 Å or less.

4. The liquid crystal device according to claim 1, wherein said flattening layer comprises an insulating material.

5. The liquid crystal device according to claim 4, wherein said insulating material comprises an organic resin.

6. The liquid crystal device according to claim 5, wherein said organic resin is a resin selected from the group consisting of polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulosic resin, melamine resin, urea resin, acrylic resin, photoresist resin and electron-beam resist resin.

7. The liquid crystal device according to claim 1, wherein said flattening layer also serve as an orientation controlling film.

8. The liquid crystal device according to claim 1, wherein spacer members are provided between the base plates and integrally with said flattening layer.

9. The liquid crystal device according to claim 1, wherein said ferroelectric liquid crystal is a chiral smectic liquid crystal.

10. The liquid crystal device according to claim 9, wherein said chiral smectic liquid crystal is in C phase, H phase, I phase, J phase, K phase, G phase or F phase.

11. The liquid crystal device according to claim 9, wherein said chiral smectic liquid crystal assumes a non-helical structure.

12. The liquid crystal device according to claim 1, wherein said ferroelectric liquid crystal is in a liquid crystal phase formed through cooling from a higher temperature phase.

13. A liquid crystal device, comprising: a pair of parallel base plates, a plurality of stripe-shaped transparent electrodes formed on each of the parallel base plates, and a ferroelectric liquid crystal disposed between the parallel base plates; at least one of said pair of parallel base plates being provided with stripe-shaped spacer members so disposed as to fill up the whole extensions of gaps between adjacent pairs of the stripe-shaped transparent electrodes, whereby the ferroelectric liquid crystal is disposed to contact only a flat face of said at least one base plate.

14. The liquid crystal device according to claim 13, wherein said flat face has a difference in height of less than 1000 Å between the portions thereof providing the maximum height and the minimum height except for the stripe-shaped spacer members.

15. The liquid crystal device according to claim 13, wherein said.flat face has a difference in height of 500 Å or less between the portions thereof providing the maximum height and the minimum height except for the stripe-shaped spacer members.

16. The liquid crystal device according to claim 13, wherein an orientation controlling film is formed on said at least one base plate and the flat face is given by the orientation controlling film.

17. The liquid crystal device according to claim 16, wherein said orientation controlling film comprises a film of an insulating material which has been subjected to an orientation treatment.

18. The liquid crystal device according to claim 17, wherein said orientation treatment comprises rubbing.

19. The liquid crystal device according to claim 17, wherein said insulating material comprises an organic resin.

20. The liquid crystal device according to claim 19, wherein said organic resin is a resin selected from the group consisting of polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulosic resin, melamine resin, urea resin, acrylic resin, photoresist resin and electron-beam resist resin.

21. The liquid crystal device according to claim 13, wherein said ferroelectric liquid crystal is a chiral smectic liquid crystal.

22. The liquid crystal device according to claim 21, wherein said chiral smectic liquid crystal is in C phase, H phase, I phase, J phase, K phase, G phase or F phase.

23. The liquid crystal device according to claim 21, wherein said chiral smectic liquid crystal assumes a non-helical structure.

24. The liquid crystal device according to claim 1, wherein said flattening layer has a function of suppressing alignment defects of the ferroelectric liquid crystal.

25. A ferroelectric liquid crystal device, comprising: a pair of base plates each comprising an electrode, and a ferroelectric liquid crystal disposed between the base plates; at least one of the base plates having thereon a flattening layer, at least one of the base plates including the flattening layer being provided with an orientation axis, said ferroelectric liquid crystal assuming a non-helical structure in the absence of an electric field.

26. The liquid crystal device according to claim 25, wherein said electrode comprises a transparent conductor film having a thickness of from 1000 Å to 3000 Å.

27. The liquid crystal device according to claim 25, wherein said flattening layer comprises a film having a planarity such that a difference in height between a portion coating the base plate and a portion coating the electrode is less than 1000 Å.

28. The liquid crystal device according to claim 25, wherein said flattening layer comprises a film having such a planarity that a difference in height between its portion coating the base plate per se and its portion coating the electrode is 500 Å or less.

29. The liquid crystal device according to claim 25, wherein said flattening layer comprises an insulating material.

30. The liquid crystal device according to claim 25, wherein said flattening layer is provided with the orientation axis to function as an alignment control film.

31. The liquid crystal device accordign to claim 25, wherein spacer members are provided between the base plates and integrally with said flattening layer.

32. The liquid crystal device according to claim 25, wherein said ferroelectric liquid crystal is a chiral smectic liquid crystal.

33. The liquid crystal device according to claim 32, wherein said chiral smectic liquid crystal is in C phase, H phase, J phase, K phase, G phase or F phase.

34. The liquid crystal device according to claim 32, wherein said chiral smectic liquid crystal assumes a non-helical structure.

35. The liquid crystal device according to claim 29, wherein said insulating material comprises an organic resin.

36. The liquid crystal device according to claim 35, wherein said organic resin is a resin selected from the group consisting of polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulosic resin, melamine resin, urea resin, acrylic resin, photoresist resin and electron-beam resist resin.

37. The liquid crystal device according to claim 25, wherein said ferroelectric liquid crystal is in a liquid crystal phase formed through cooling from a higher temperature phase.

* * * * *

UNITED STATES PATENT AND TRADEMARK OFFICE
CERTIFICATE OF CORRECTION

PATENT NO. : 4,744,639
DATED : May 17, 1988
INVENTOR(S) : AKIRA TSUBOYAMA

It is certified that error appears in the above-identified patent and that said Letters Patent is hereby corrected as shown below:

COLUMN 1

Line 59, "in the case where" should read --when--.
    Line 61, "as" should be deleted.
    Line 63, "resulting" should read --which results--.
    Line 67, "a cause by which" should read --that--.

COLUMN 4

Line 26, "in" should be deleted.

COLUMN 9

Line 65, "reference numeral" should be deleted.
    Line 66, "112 denote a spacer member" should read --spacer member is unnumbered--.

COLUMN 12

Line 51, "serve" should read --serves--.

UNITED STATES PATENT AND TRADEMARK OFFICE
CERTIFICATE OF CORRECTION

PATENT NO. : 4,744,639

DATED : May 17, 1988

INVENTOR(S) : AKIRA TSUBOYAMA

It is certified that error appears in the above-identified patent and that said Letters Patent is hereby corrected as shown below:

COLUMN 14

Line 28, "accordign" should read --according--.

Signed and Sealed this

Third Day of January, 1989

Attest:

DONALD J. QUIGG

Attesting Officer        Commissioner of Patents and Trademarks